United States Patent [19]

Piontek et al.

[11] 4,013,180
[45] Mar. 22, 1977

[54] DEVICE FOR THE REMOVAL OF BULK MATERIAL FROM BULK MATERIAL DUMPS

[75] Inventors: Günter Piontek, Drevenack; Heinz Firlay, Bochum; Heinz Westheider, Oberhausen, all of Germany

[73] Assignee: Deutsche Babcock & Wilcox Aktiengesellschaft, Oberhausen, Germany

[22] Filed: May 16, 1975

[21] Appl. No.: 578,348

[30] Foreign Application Priority Data

May 16, 1974 Germany .......................... 2423715
Mar. 12, 1975 Germany .......................... 2510665

[52] U.S. Cl. .............................. 214/10; 198/518; 198/519; 37/190
[51] Int. Cl.² ............................. B65G 65/28
[58] Field of Search .......... 214/10; 198/9, 36, 213, 198/216, 217, 209, 518, 519; 37/189–192 A; 299/89

[56] References Cited

UNITED STATES PATENTS

| 455,384 | 7/1891 | Birkholz | 198/216 X |
| 2,156,066 | 4/1939 | Royer et al. | 299/89 X |
| 3,334,759 | 8/1967 | Ludwig | 214/10 |
| 3,461,579 | 8/1969 | Turner | 37/189 |
| 3,500,988 | 3/1970 | Smith | 214/10 X |
| 3,885,665 | 5/1975 | Fisher | 198/213 X |

FOREIGN PATENTS OR APPLICATIONS

| 1,912,420 | 9/1970 | Germany | 214/10 |
| 1,175,157 | 7/1964 | Germany | 214/10 |

*Primary Examiner*—Frank E. Werner
*Attorney, Agent, or Firm*—Max Fogiel

[57] ABSTRACT

A device for the removal of bulk materials from bulk material storage sites or dumps. A breakup unit is attached to a pick up arrangement and is adaptable to the inclination of the bulk material storage dump. The breakup unit has a rotatable roller provided with buckets which are inclined with respect to the axis of the roller and function as conveying elements. These conveying elements are arranged in a helical manner about the roller, and are connected to the roller by means of pins. Each conveying element has two legs arranged symmetrical with respect to the axis of rotation of the roller.

9 Claims, 3 Drawing Figures

DEVICE FOR THE REMOVAL OF BULK MATERIAL FROM BULK MATERIAL DUMPS

BACKGROUND OF THE INVENTION

Bulk material storage sites or dumps, in the art, are made up of rows of varying bulk material qualities. Since the pickup device, e.g., a wheel bucket loader picks up only the bulk material at the base of the dump, the material located above slides down without being checked. To avoid these disadvantages, it is already known in the art to provide a breakup device ahead of the pickup device. This delivers to the pickup device a section which extends uniformly across the dump cross-section not reached by the pickup device.

The breakup device may consist of a rake which is passed back and forth along the embankment of the dump as disclosed in German Pat., DT-AS 1 162 282. Due to this movement, the bulk material in the dump is loosened and slides down the dump embankment towards the pickup device. The pickup device usually consists of a bucket wheel located at the end of a boom. The disadvantage of the rakes also being located on the boom is, that they are relatively heavy, and therefore make necessary a similarly heavy counterweight at the other end of the boom.

Furthermore, it is already known in the art to use a rotating spiked roller extending across the embankment. Even the spiked roller, like the rake, can loosen the bulk material only by causing it to slide down. Hence both breakup devices can be used only for those bulk materials which are capable of sliding down. They are not suited for material stored in the open and exposed to the weather, such as coal, e.g., which tends to cake. In this case, no material mixture uniform throughout the dump cross-section can be removed.

Finally, it is also known in the art to connect a scraper chain ahead of the pickup device as disclosed in German Pat. DT-PS 1,243 103. This scraper chain, like the rake, has the disadvantage of being heavy and thus increases the expense of the overall structure.

During the removal of bulk material from the dump, the pickup device first travels in one direction along the dump. At the end of the dump, the direction of motion of the pickup device is reversed and again a section of the dump is removed. Therefore, one must require from the breakup device that it presents to the pickup device a section uniform across the dump cross-section for any direction of motion.

It is, therefore, an object of the present invention to design the breakup device for the above-mentioned arrangement in such a way that with small construction expenditure, a mixture uniform across the dump cross-section can be picked up even for bulk material which tends to cake. In addition, uniform bulk material must be possible even when the direction of motion of the pickup device is changed.

Another object of the present invention is to provide a breakup device of the foregoing character which is simple in design and has its parts readily accessible for maintenance and service.

A still further object of the present invention is to provide a breakup device, as described, which has a substantially long operating life.

SUMMARY OF THE INVENTION

The objects of the present invention are achieved as follows: The roller is provided with conveying means consisting of buckets inclined obliquely with respect to the axis of rotation of the roller. The device in accordance with the present invention lifts a cut from the dump and delivers it to the foot of the embankment where it is picked up by the pickup device. In this manner, bulk material which does not loosen by scraping alone or only in an irregular manner, can be removed. The breakup device itself is simple and easily constructed.

Furthermore, it is proposed that each conveying means consists of two buckets arraged symmetrical to the axis of rotation of the roller. Due to this symmetrical arrangement of the buckets, always one of the buckets is in operation. One direction of motion of the pickup device is associated with a definite direction of motion of the breakup device. However, since the breakup device conveys in any direction of motion, the pickup device can travel in both directions.

The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
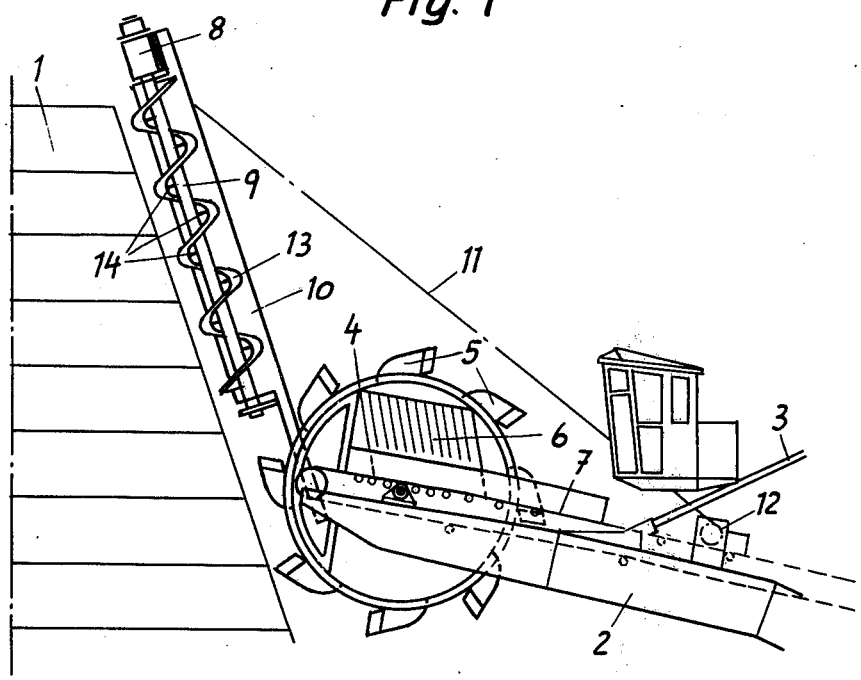
FIG. 1 is a lengthwise section of a pickup arrangement with a breakup device in accordance with the present invention.
Figure 2:
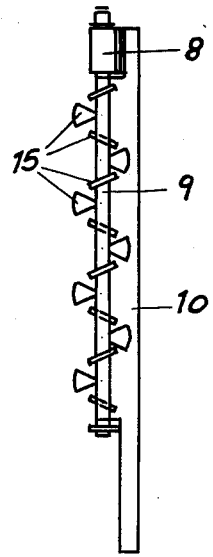
FIG. 2 shows another embodiment of the breakup device.

Referring to the drawing, there is partially shown a bucket wheel dump device used for the reloading of bulk material which is stored in a dump or storage site 1 in rows of nonuniform composition. Such bucket wheel dump devices are known in the art and essentially consist of a carriage through which it is moved along dump 1. On top of the carriage, a boom 2 is located. The angle of the boom 2 can be varied by means of cable line 3. At its forward end, the boom 2 carries a bucket wheel 4 whose buckets 5 pick up the bulk material at the bottom of the dump and discharge it via the chute 6 onto a conveyor belt 7.

In order to remove material from the dump in a uniform fashion, a breakup device is placed ahead of the bucket wheel 4. This breakup device extends across the entire cross-section of the dump above the bucket wheel 4. It consists of a roller or drum 9 driven by a motor 8 and a gear train. The roller 9 is supported in a carrier 10 which can be pivoted at the end of boom 2. The carrier 10 can be adjusted to the angle of the dump. For this purpose, the carrier 10 is attached to a cable 11 which leads to a cable winch 12 mounted on the boom 2. Instead of cable and cable winch, one may also use a jointed lever system actuated by a tackle.

The roller 9 is equipped with conveying means which in the embodiment shown in FIG. 1, consists of a worm trough 13 which surrounds the roller 9 at a distance. The tape trough 13 is fastened to roller 9 by means of pins 14.

The distance between tape trough 13 and roller 9 depends on the layout of the individual case. It will be expedient to divide the area covered by the breakup device in such a way, that it is one-third free area and two-thirds conveyor area. The resulting free area prevents the bulk material from caking inside the worm.

With the breakup device shown in FIG. 1, the worm trough is divided into individual worm paddles 15 which surround the roller 9 in a helical manner.

The paddles 15 so arranged or the buckets operate according to the same principle as the worm trough 13 by breaking loose bulk material and transporting it to the base of the dump. Interruption of the helix prevents clogging of the auger.

Figure 3:
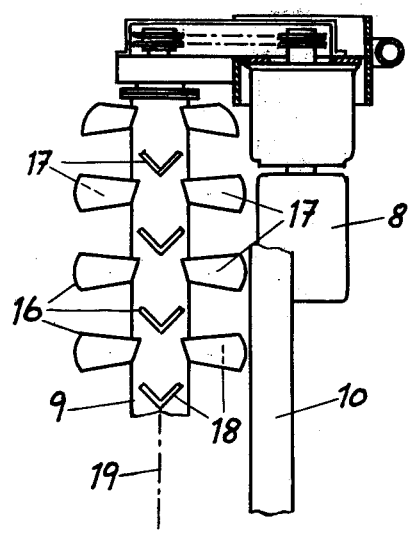
FIG. 3 shows a still further embodiment of the breakup device.

According to FIG. 3 the conveying means 16 surrounding roller 9 consist of legs 17 and 18 which form an angle with respect to the axis of rotation 19 of roller 9. This angle may be 45°. The legs 17 and 18 are of planar steel sheet and are welded to the roller 9. Each conveying means contains two such legs 17 and 18 located symmetrically with respect to axis of rotation 19 of roller 9. In the case shown here, the buckets 17 and 18 of each conveying means are V-shaped.

With a rotation of the roller 9 towards the left, only the left-hand legs 17 of conveying means 16 come into play and throw the broken-up bulk material in the direction of motion of the bucket wheel 4 in front of the buckets 5. In case of a reversal of the direction of motion of the pickup device, the direction of motion of the roller 9 must also be reversed, so that the right hand legs 18 of the conveying means 16 come into play and throw the bulk material in front of the buckets 5 of bucket wheel 4. In this manner, the breakup device can be set for both directions of motion of the pickup device when removing material from the dump.

Two conveying means 16 each are located at both sides of roller 9 in a plane of rotation passed through them. In the next plane of rotation, again two such conveying means 16 are provided, which, however, are displaced angularly relative to the preceding rotation plane by 90°. In this manner, the entire roller shell is covered with conveying elements 16.

Without further analysis, the foregoing will hopefully reveal the gist of the present invention that others can, by applying current knowledge, readily adapt it for various applications without omitting features that, from the standpoint of prior art, fairly constitute essential characteristics of the generic or specific aspects of this invention, and therefore, such adaptation should and are intended to be comprehended within the meaning and range of equivalence of the following claims.

We claim:

1. A device for removal of bulk materials from bulk material storage sites comprising, in combination, pickup means; breakup means adaptable to the inclination of the bulk material storage site, said breakup means comprising a rotatable shaft roller having blades inclined with respect to the longitudinal axis of the shaft roller and comprising conveying elements, said pickup means comprising bucket wheel means with diameter smaller than the height of said storage site, said breakup means being in front of said bucket wheel means and extending from the cutting surface of said bucket wheel means; said breakup means operating cooperatively with said bucket wheel means and conveying bulk material to the front of the buckets of said bucket wheel means; boom means for carrying said bucket wheel means, said breakup means being mounted on said boom means, said breakup means contacting said storage site above said bucket wheel means, whereby said breakup means is in contact with the storage site prior to contact of the bucket wheel means with said storage site, said inclined blades removing a cut section from said storage site and conveying throwlessly the material in said section in front of the buckets of said bucket wheel means so that said bucket wheel means picks up bulk material from the base portion of said storage site and from the portion lying above the base portion, said breakup means removing a cut section from the storage site in the form of broken material, said broken material being carried downward along the axis of said shaft roller to the front of the buckets of said bucket wheel means.

2. The device as defined in claim 1 wherein said conveying elements are helically arranged around said roller.

3. The device as defined in claim 1 wherein said conveying elements are spaced from said roller at a predetermined distance.

4. The device as defined in claim 3 including pin means for connecting said conveying elements to said roller.

5. The device as defined in claim 1 including a continuous worm trough surrounding said roller.

6. The device as defined in claim 1 including a plurality of worm paddles surrounding said roller.

7. The device as defined in claim 1 wherein each of said conveying elements comprises two elements on said shaft roller and arranged symmetrically with respect to the axis of rotation of said roller.

8. The device as defined in claim 7 wherein at predetermined cross-sectional planes of said roller, two conveying elements are displaced relative to each other by 180° in each of said cross-sectional planes.

9. The device as defined in claim 8 wherein said conveying elements are arranged in pairs in each of said cross-sectional planes, a pair of conveying elements in one cross-sectional plane being displaced angularly by 90° with respect to the pair of conveying elements in the adjacent cross-sectional planes.

* * * * *